US012656758B2

(12) United States Patent
Wu et al.

(10) Patent No.: US 12,656,758 B2
(45) Date of Patent: Jun. 16, 2026

(54) METHOD FOR ESTABLISHING DYEING MODEL, DYEING METHOD, AND DYEING DEVICE

(71) Applicant: Fulian Yuzhan Precision Technology Co., Ltd., Shenzhen (CN)

(72) Inventors: Chen-Ting Wu, New Taipei (TW); Hong-Wei Zhang, Zhengzhou (CN); Wei-Tao Si, Shenzhen (CN); Qing-Yu Wang, Shenzhen (CN); Jing-Jing Liu, Shenzhen (CN); Li Yan, Shenzhen (CN); Fei Du, Shenzhen (CN); Wei Li, Shenzhen (CN); Bing-Ru Zhou, Shenzhen (CN); Jun-Mei Liu, Shenzhen (CN); Xiao-Qing Yi, Shenzhen (CN)

(73) Assignee: Fulian Yuzhan Precision Technology Co., Ltd., Shenzhen (CN)

( * ) Notice: Subject to any disclaimer, the term of this patent is extended or adjusted under 35 U.S.C. 154(b) by 351 days.

(21) Appl. No.: 18/232,378

(22) Filed: Aug. 10, 2023

(65) Prior Publication Data

US 2023/0384769 A1 Nov. 30, 2023

(30) Foreign Application Priority Data

Aug. 11, 2022 (CN) .......................... 202210960690.X
Aug. 11, 2022 (CN) .......................... 202210960695.2
(Continued)

(51) Int. Cl.
*G05B 19/418* (2006.01)
(52) U.S. Cl.
CPC ... *G05B 19/4183* (2013.01); *G05B 19/41885* (2013.01)

(58) Field of Classification Search
CPC ...................... G05B 19/4183; G05B 19/41885
See application file for complete search history.

(56) References Cited

U.S. PATENT DOCUMENTS 6,584,372 B1 * 6/2003 Murphy ................. D21H 23/78
356/402
2005/0056546 A1 * 3/2005 Kia ......................... C25D 11/22
205/324
(Continued)

OTHER PUBLICATIONS

Bae, Sung Hwa, Incheol Chol, and Injoon Son. "Effects of the process conditions on the color of dye-treated anodized AA5052." Journal of Nanoscience and Nanotechnology 19.7 (2019): 4097-4102. (Year: 2019).*

*Primary Examiner* — Christopher E. Everett
(74) *Attorney, Agent, or Firm* — ScienBiziP, P.C.

(57) ABSTRACT

The present application discloses an establishing method for establishing a dyeing model, a dyeing method, a device, and a storage medium which are applied to the dyeing technology field. The establishing method includes: obtaining historical data of dyeing a workpiece, the historical data includes historical dyeing time of the workpiece and historical color value of the workpiece after dyeing; and obtaining the dyeing model by training an initial model based on the historical data. The dyeing model is established using the historical data, and can establish a relationship between the dyeing time and the color value of the workpiece after dyeing. Based on the dyeing model, the dyeing time required for the workpiece can be determined according to a color value of the workpiece after dyeing. A precise dyeing process can be realized by determining the dyeing time using the dyeing model instead of determining the dyeing time manually.

20 Claims, 8 Drawing Sheets

(30)        Foreign Application Priority Data

| Aug. 11, 2022 | (CN) | ......................... | 202210960707.1 |
| Aug. 11, 2022 | (CN) | ......................... | 202210960717.5 |

(56)        References Cited

U.S. PATENT DOCUMENTS

| 2013/0248373 | A1* | 9/2013 | Shen | ..................... | C25D 11/16 |
| | | | | | 205/120 |
| 2024/0052561 | A1* | 2/2024 | Mao | ..................... | D06P 1/0032 |

* cited by examiner

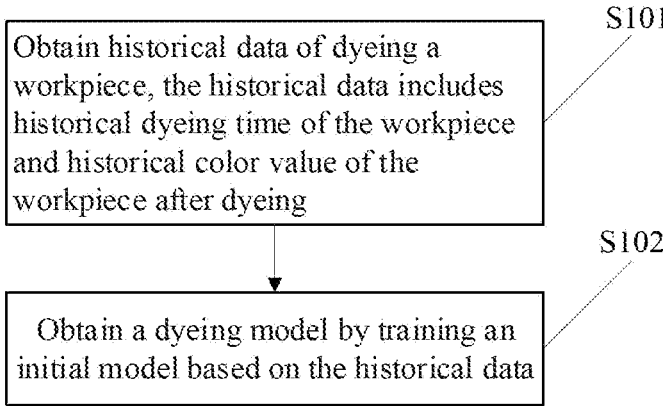

S101

Obtain historical data of dyeing a workpiece, the historical data includes historical dyeing time of the workpiece and historical color value of the workpiece after dyeing

S102

Obtain a dyeing model by training an initial model based on the historical data

FIG. 1

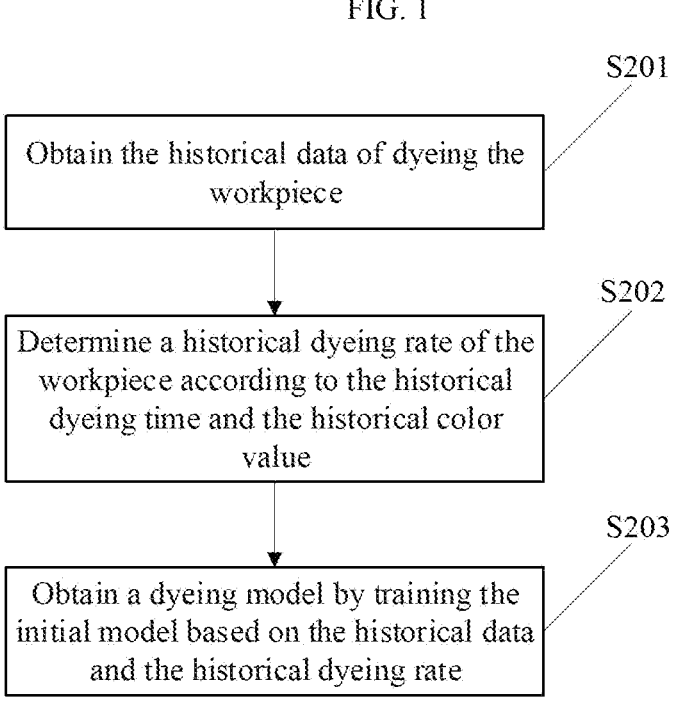

S201

Obtain the historical data of dyeing the workpiece

S202

Determine a historical dyeing rate of the workpiece according to the historical dyeing time and the historical color value

S203

Obtain a dyeing model by training the initial model based on the historical data and the historical dyeing rate

FIG. 2

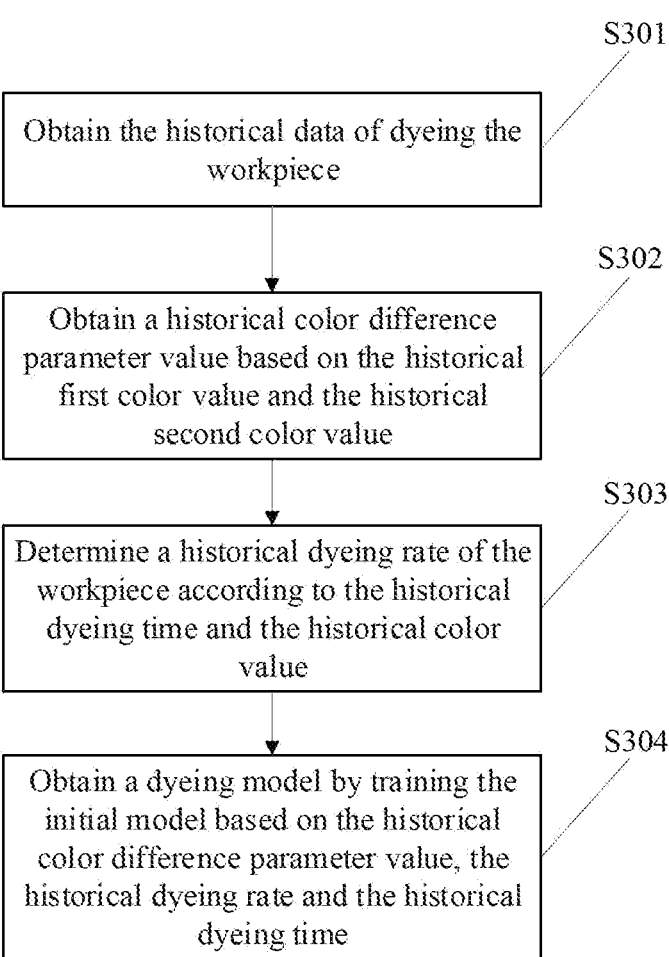

S301

Obtain the historical data of dyeing the workpiece

S302

Obtain a historical color difference parameter value based on the historical first color value and the historical second color value

S303

Determine a historical dyeing rate of the workpiece according to the historical dyeing time and the historical color value

S304

Obtain a dyeing model by training the initial model based on the historical color difference parameter value, the historical dyeing rate and the historical dyeing time

FIG. 3

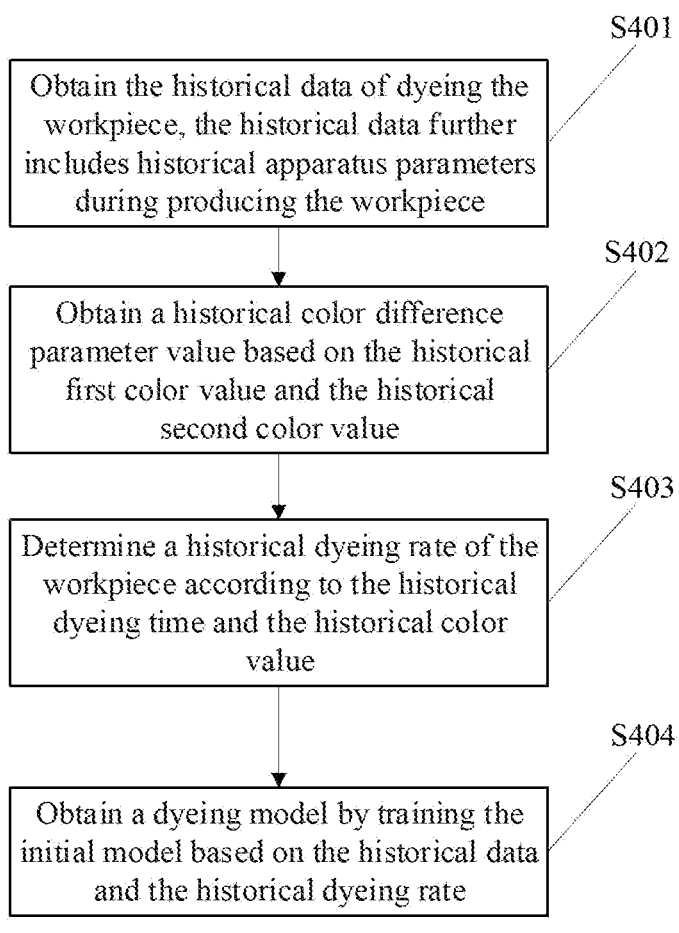

S401

Obtain the historical data of dyeing the workpiece, the historical data further includes historical apparatus parameters during producing the workpiece

S402

Obtain a historical color difference parameter value based on the historical first color value and the historical second color value

S403

Determine a historical dyeing rate of the workpiece according to the historical dyeing time and the historical color value

S404

Obtain a dyeing model by training the initial model based on the historical data and the historical dyeing rate

FIG. 4

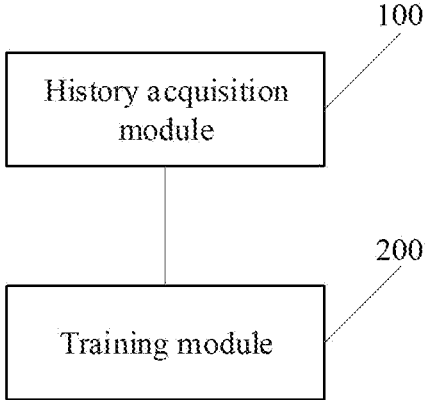

History acquisition module

100

Training module

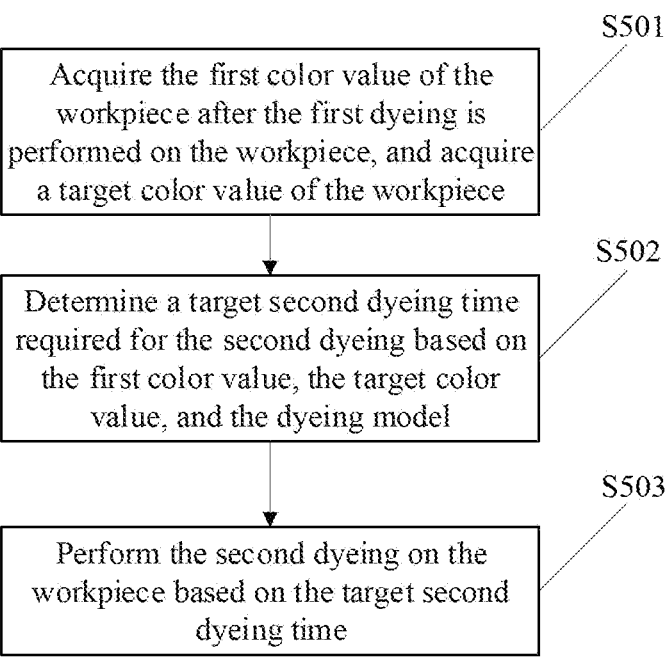

S501

Acquire the first color value of the workpiece after the first dyeing is performed on the workpiece, and acquire a target color value of the workpiece

S502

Determine a target second dyeing time required for the second dyeing based on the first color value, the target color value, and the dyeing model

S503

Perform the second dyeing on the workpiece based on the target second dyeing time

FIG. 6

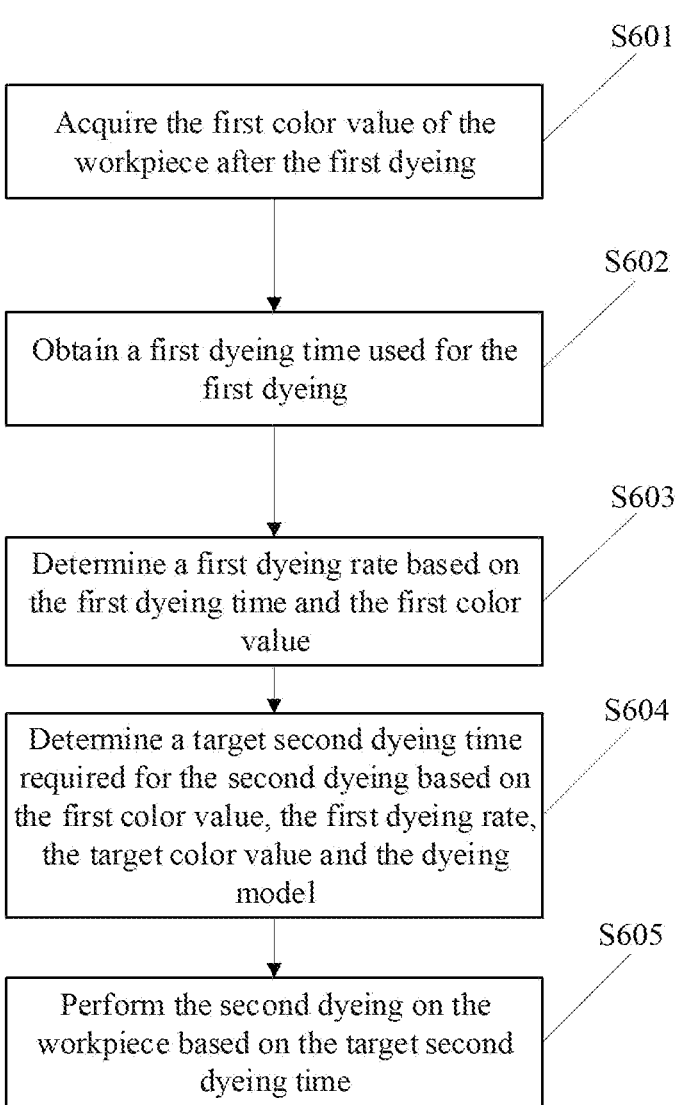

S601

Acquire the first color value of the workpiece after the first dyeing

S602

Obtain a first dyeing time used for the first dyeing

S603

Determine a first dyeing rate based on the first dyeing time and the first color value

S604

Determine a target second dyeing time required for the second dyeing based on the first color value, the first dyeing rate, the target color value and the dyeing model

S605

Perform the second dyeing on the workpiece based on the target second dyeing time

FIG. 7

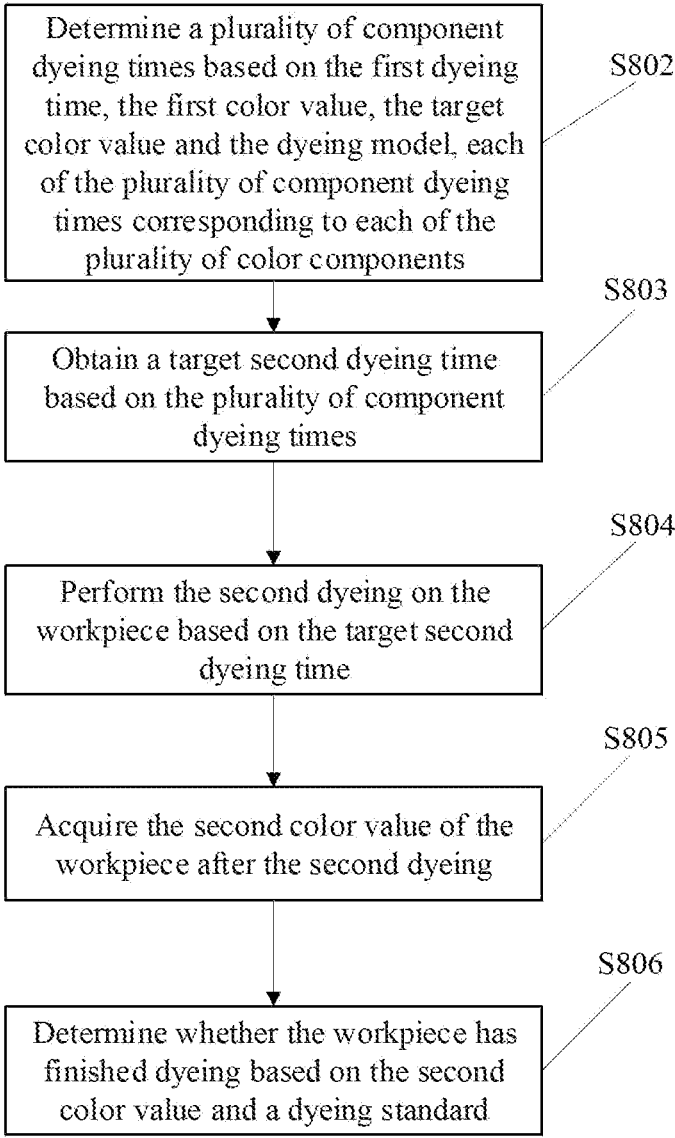

Determine a plurality of component dyeing times based on the first dyeing time, the first color value, the target color value and the dyeing model, each of the plurality of component dyeing times corresponding to each of the plurality of color components     S802

Obtain a target second dyeing time based on the plurality of component dyeing times     S803

Perform the second dyeing on the workpiece based on the target second dyeing time     S804

Acquire the second color value of the workpiece after the second dyeing     S805

Determine whether the workpiece has finished dyeing based on the second color value and a dyeing standard     S806

FIG. 9

METHOD FOR ESTABLISHING DYEING MODEL, DYEING METHOD, AND DYEING DEVICE

FIELD

The present application relates to the dyeing technology, in particular to a method for establishing a dyeing model, a dyeing method, a dyeing device.

BACKGROUND

The dyeing of aluminum products generally undergoes a plurality of anodic processes, and includes: degreasing, alkali biting, chemical polishing, neutralization, anodizing, acid treatment before dyeing, dyeing and sealing, etc. Parameters of each of the plurality of anodic processes, such as an anodizing time, an anodizing voltage, a pre-dyeing treatment time, an acid concentration before dyeing treatment, an acid pH before dyeing treatment, a dyeing time, a ratio of a dyeing dye, a dye concentration, a temperature of a dyeing tank, a pH of the dyeing tank, a sealing time, a sealing temperature, etc. All have an impact on a final color. The final color after dyeing is related to the dyeing time, and to form a gradient color or a plurality of colors, it is necessary to perform second dyeing on a part to be dyed through a second dyeing process. The dyeing of a designed color has always been controlled by expert's experience, which makes a second dyeing time not accurate enough, lacks scientific judgment, and is prone to poor dyeing due to human misjudgment. Therefore, how to provide a technical solution for accurate dyeing is an urgent problem to be solved by those skilled in the art.

BRIEF DESCRIPTION OF THE DRAWINGS

In order to more clearly illustrate the technical solutions of the embodiments of the present application, the following will briefly introduce the accompanying drawings that need to be used in the embodiments. Obviously, the accompanying drawings in the following description are only some embodiments of the present application. Those of ordinary skill in the art can also obtain other drawings based on these drawings without paying creative labor.

FIG. 1 is a flow chart of a method for establishing a dyeing model provided by one embodiment of the present application;

FIG. 2 is a flow chart of a first detailed method for establishing the dyeing model provided by one embodiment of the present application;

FIG. 3 is a flow chart of a second detailed method for establishing the dyeing model provided by one embodiment of the present application;

FIG. 4 is a flow chart of a third detailed method for establishing the dyeing model provided by one embodiment of the present application;

FIG. 5 is a structural block diagram of an establishing system of a dyeing model provided by one embodiment of the present application;

FIG. 6 is a flow chart of a dyeing method provided by one embodiment of the present application;

FIG. 7 is a flow chart of a first detailed dyeing method provided by one embodiment of the present application;

FIG. 9 is a flow chart of a third detailed dyeing method provided by one embodiment of the present application;

DETAILED DESCRIPTION

Figure 8:
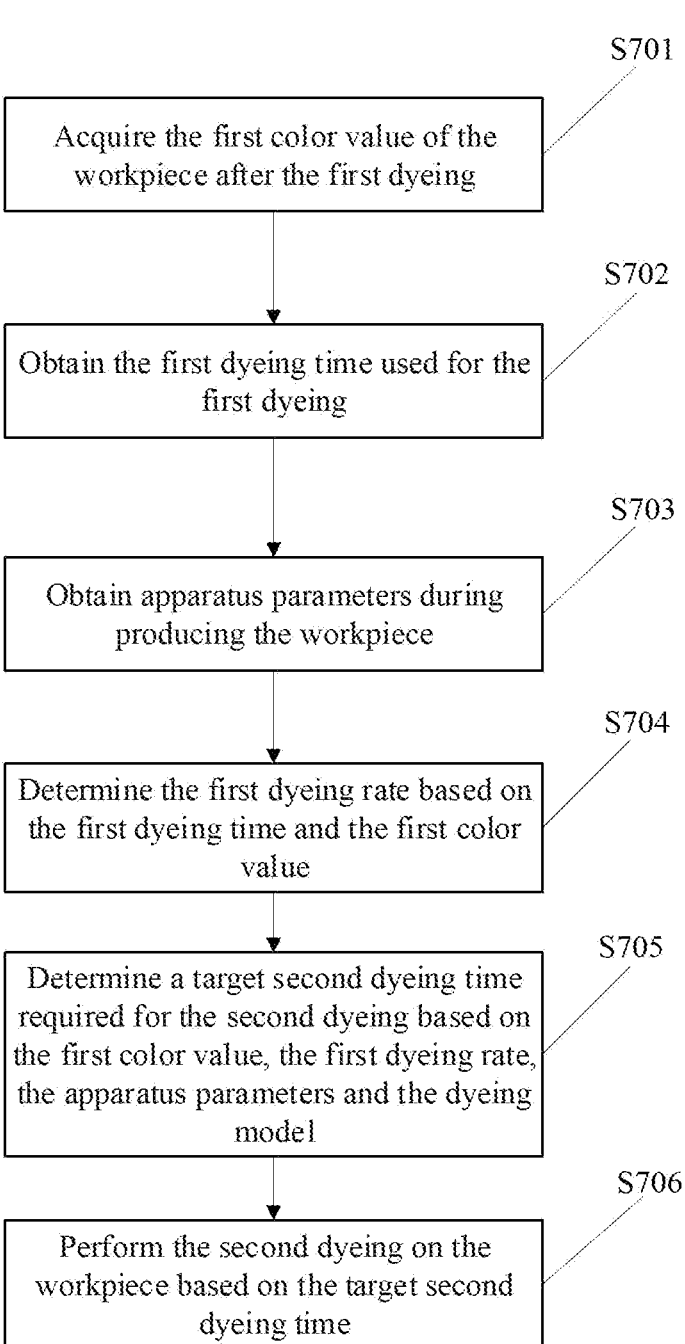
FIG. 8 is a flow chart of a second detailed dyeing method provided by one embodiment of the present application.

The present application provides a dyeing method. In the prior art, when dyeing, especially when it is necessary to perform a plurality of dyeing processes to form gradient colors, etc., a dyeing time needs to be judged by humans. The dyeing time is not accurate enough, lacks scientific judgment, and is easy to cause poor dyeing due to manual misjudgment.

The method for establishing a dyeing model provided by the present application includes: obtaining historical data of dyeing a workpiece, the historical data comprising historical dyeing time of the workpiece and historical color value of the workpiece after dyeing; and obtaining the dyeing model by training an initial model based on the historical data. The dyeing model can be established using the historical data, and the dyeing model can establish a correspondence relationship between the dyeing time and the color value of the workpiece after dyeing. Based on the dyeing model, the dyeing time required for the workpiece can be determined according to a color value of the workpiece after dyeing. A precise dyeing process can be realized by determining the dyeing time using the dyeing model instead of determining the dyeing time manually.

In order to enable those skilled in the art to better understand the technology solution of the present application, the present application will be further described in detail below in conjunction with the drawings and specific implementation methods. Apparently, the described embodiments are only some of the embodiments of this application, not all of them. Based on the embodiments in this application, all other embodiments obtained by persons of ordinary skill in the art without making creative efforts belong to the scope of protection of this application.

Please refer to FIG. 1, which is a flow chart of a method for establishing a dyeing model provided in an embodiment of the present application. The method for establishing the dyeing model is applied to a dyeing device. According to different requirements, an order of blocks in the flowchart of the method for establishing the dyeing model can be changed, and some blocks can be omitted. Referring to FIG. 1, in the embodiment of the present application, the method for establishing the dyeing model includes following blocks.

Block S101, the dyeing device obtains historical data of dyeing a workpiece, the historical data includes historical dyeing time of the workpiece and historical color value of the workpiece after dyeing.

At this block, it is necessary to obtain data when the workpiece is dyed in the history, that is, the historical data. The historical data needs to include the historical dyeing time and the historical color value of the workpiece after dyeing, the historical dyeing time is a time spent dyeing the workpiece in the history, and the historical color value is a color value of the workpiece after the workpiece is dyed in the history. Normally, each color value in the embodiment of the present application is usually represented by a L/A/B color mode. Of course, in the embodiment of the present application, other color modes can also be used to represent each color value, and its specific content can be set according to an actual situation, and is not specifically limited here.

It should be noted that, generally, in the embodiments of the present application, in a historical dyeing process corresponding to the historical data, it is necessary to keep apparatus parameters of a dyeing apparatus substantially the same during dyeing. That is, the apparatus parameters of the dyeing apparatus used in the historical dyeing process need to be non-variable, so as to ensure that the dyeing model can accurately represent a correspondence between the historical dyeing time and the historical color value of the workpiece after dyeing. The apparatus parameters may include a temperature of a tank body of the dyeing device, a liquid PH value, etc., which are not specifically limited here. The historical dyeing time includes a historical first dyeing time of performing a first dyeing on the workpiece and a historical second dyeing time of performing a second dyeing on the workpiece; the historical color value includes a historical first color value of the workpiece after the first dyeing and a historical second color value of the workpiece after the second dyeing. It should be noted that the dyeing apparatus includes multiple equipment used in a process of dyeing the workpiece. For example, the multiple equipment may include a dyeing tank, a heating pipe arranged on an upper end of the dyeing tank, and other equipment.

Block S102, the dyeing device obtains a dyeing model by training an initial model based on the historical data.

In this block, according to the above historical data, the initial model needs to be trained based on the historical dyeing time and the historical color value, so as to establish a corresponding relationship between a dyeing time and a color value of the workpiece, and obtain the dyeing model. The initial model may be a regression model, or a neural network model, etc., as long as it can reflect the correspondence between the dyeing time and the color value of the workpiece. It should be noted that, depending on different types of the initial model, a corresponding training process is adopted in a process of training the initial model.

In this block, the initial model can be preliminarily trained based on the historical data to obtain a basic dyeing model, that is, a dyeing model that has not been screened after training. The basic dyeing model establishes a relationship between the color difference parameter value and the second dyeing time, so at this block, the second dyeing time can be predicted based on historical color difference parameter value. By comparing a predicted second dyeing time with the historical second dyeing time in the historical data, model evaluation parameters of each basic dyeing model are determined. The model evaluation parameters may include, for example, a mean absolute error (MAE), a mean error percentage (MAPE), a determination coefficient $R^2$, an error, etc., or other parameters that can evaluate a performance of a model, depending on specific circumstances, and are not specifically limited here.

In this block, a plurality of basic dyeing models can be obtained through training the initial model for one time or more than one time, and after at least one basic dyeing model is obtained, this block is performed, and the historical color difference parameter value is input into each of the at least one basic dyeing model, and the predicted second dyeing time corresponding to each of the at least one basic dyeing model is calculated, therefore, at least one predicted second dyeing time is obtained. Each of the at least one predicted second dyeing time is an output result of a corresponding basic dyeing model. The second dyeing is performed on the workpiece according to each of the at least one predicted second dyeing time, and obtain at least one second color value of the workpiece after each second dyeing is completed, that is, the color value of the workpiece after each second dyeing. Obtaining at least one color difference by calculating a difference between each of the at least one second color value and a target color value, and obtaining at least one color difference yield based on each of the at least one color difference, comparing each of the at least one color difference yield with a preset standard yield, and when any one color difference yield of the at least one color difference yield is greater than the preset yield standard, the basic dyeing model corresponding to the any one color difference yield is determined to be a final dyeing model. The dyeing device can determine the final dyeing model as the dyeing model obtained by training the initial model based on the historical data.

In other embodiments, the dyeing device obtains a plurality of basic dyeing models by training a plurality of initial models based on the historical data. That is, in the embodiment of the present application, the plurality of initial models can be preset, and then the historical data can be used to train the plurality of initial models to obtain the plurality of basic dyeing models, so as to determine the final dyeing model from the plurality of basic dyeing models.

Specifically, this block may include: obtaining a plurality of basic dyeing models by training a plurality of initial models based on the historical color difference parameter value and the historical second dyeing time. That is, in the embodiment of the present application, the historical color difference parameter value and the historical second dyeing time are used for training each of the plurality of initial models, so that each of the plurality of basic dyeing models can also reflect a corresponding relationship between the historical color difference parameter value and the historical second dyeing time.

It should be noted that after the block S101, the historical data may be cleaned. That is, after the block S101, the embodiment of the present application may further include: obtaining training data by cleaning abnormal data in the historical data. Correspondingly, the block S102 specifically includes: obtaining a dyeing model by training the initial model based on the training data. The cleaning of the abnormal data may refer to the prior art, which will not be repeated here. By cleaning the historical data, an accuracy and an integrity of the historical data can be guaranteed.

A method for establishing a dyeing model provided in an embodiment of the present application includes: obtaining historical data of dyeing a workpiece, the historical data including historical dyeing time of the workpiece and historical color value of the workpiece after dyeing; and obtaining a dyeing model by training an initial model based on the historical data. The dyeing model can be established using the historical data, and the dyeing model can establish a correspondence relationship between the dyeing time and the color value of the workpiece after dyeing. Based on the dyeing model, the dyeing time required for the workpiece can be determined according to a color value of the workpiece dyeing. A precise dyeing process can be realized by determining the dyeing time using the dyeing model instead of determining the dyeing time manually.

The specific content about the establishment method of a dyeing model provided by this application will be described in detail in the following application examples.

Please refer to FIG. 2, FIG. 2 is a flow chart of a first specific method for establishing a dyeing model provided in the embodiment of the present application. The first specific method for establishing the dyeing model is applied to the dyeing device. According to different requirements, an order of blocks in the flowchart of the first specific method can be changed, and some blocks can be omitted.

Referring to FIG. 2, in the embodiment of the present application, the first specific method for establishing the dyeing model includes following blocks.

Block S201, the dyeing device obtains the historical data of dyeing the workpiece.

This block is basically the same as block S101 in the above-mentioned embodiment of the present application. For details, please refer to the above-mentioned embodiment of the application, and details are not repeated here.

Block S202, the dyeing device determines a historical dyeing rate of the workpiece according to the historical dyeing time and the historical color value.

In this block, the historical color value is divided by the corresponding historical dyeing time to determine the historical dyeing rate representing a speed of dyeing the workpiece in the historical data, and then in subsequent blocks, the initial model is trained in combination with the historical dyeing rate. Usually, a color value corresponds to a plurality of color components. Taking a LAB color mode as an example, a color value corresponds to three color components: L value, A value, and B value. Correspondingly, in this block, specifically, a dyeing component rate corresponding to each of the plurality of color components can be determined according to each color component in the historical color value and the corresponding historical dyeing time. For example, if a historical color value is $L_1/A_1/B_1$, and a historical dyeing time is T, then at this block, the dyeing device can obtain three dyeing component rates $V_L$, $V_A$, and $V_B$ through $V_L=L_1/T$, $V_A=A_1/T$, $V_B=B_1/T$, thereby obtaining the historical dyeing rate $V_L/V_A/V_B$.

Block S203, the dyeing device obtains a dyeing model by training the initial model based on the historical data and the historical dyeing rate.

In this block, the dyeing device obtains a final dyeing model by training the initial model based on the historical data, including the historical dyeing time of the workpiece and the historical color value of the workpiece after dyeing, and the historical dyeing rate. The method for establishing the dyeing model provided in the embodiment of the present application uses the historical data to establish the dyeing model that can establish a corresponding relationship between the dyeing time and the color value of the workpiece after dyeing, and an accuracy of the dyeing model can be improved by establishing the dyeing model combining the dyeing rate. Based on the dyeing model, the dyeing time required for the workpiece can be determined according to a color value of the workpiece after dyeing. A precise dyeing process can be realized by determining the dyeing time using the dyeing model instead of determining the dyeing time manually.

The specific content about the method of establishing the dyeing model provided by this application will be described in detail in the following examples.

Please refer to FIG. 3, FIG. 3 is a flow chart of a second specific method for establishing a dyeing model provided in the embodiment of the present application. The second specific method for establishing the dyeing model is applied to the dyeing device. According to different requirements, an order of blocks in the flowchart of the second specific method can be changed, and some blocks can be omitted.

Referring to FIG. 3, in the embodiment of the present application, the second specific method for establishing the dyeing model includes following blocks.

Block S301, the dyeing module obtains the historical data of dyeing the workpiece.

In the embodiment of the present application, the historical dyeing time included in the historical data includes a historical first dyeing time of performing a first dyeing on the workpiece and a historical second dyeing time of performing a second dyeing on the workpiece; the historical color value included in the historical data includes a historical first color value of the workpiece after the first dyeing and a historical second color value of the workpiece after the second dyeing.

That is to say, in the embodiment of the present application, it can be specifically aimed at a scene where the workpiece is dyed twice. Parameters input to the initial model during training include the color value of the workpiece after the first dyeing is performed on the workpiece in history, that is, the first historical color value; and the color value of the workpiece after the second dyeing is performed on the workpiece, that is, the second historical color value. At the same time, the parameters further include a time spent on the performing of the first dyeing on the workpiece, that is, the historical first dyeing time, and a time spent on the performing of the second dyeing on the workpiece, that is, the historical second dyeing time. In the subsequent block, the initial model is trained in combination with the historical dyeing rate, so that the trained model can specifically clarify a corresponding relationship between the color value and the second dyeing time.

Specifically, in this embodiment of the present application, the historical first color value is a statistical value of a plurality of historical first color values, and the historical second color value is a statistical value of a plurality of historical second color values. The statistical value may be a median value, an average value, a maximum value, a minimum value, etc. of the corresponding parameter, which may specifically represent a statistical result of the corresponding parameter within a period of time. For example, the historical first color value may be the median value of the plurality of historical first color values, and the historical second color value may be the median value of the plurality of historical second color values, thereby eliminating an influence of measurement errors on the plurality of historical color values. Of course, the specific content of the statistical value can be set according to the actual situation, and no specific limitation is made here.

Block S302, the dyeing device obtains a historical color difference parameter value based on the historical first color value and the historical second color value.

At this block, an amount of change in color value of the workpiece before and after the second dyeing can be determined based on the historical first color value and historical second color value, that is, the historical color difference parameter value. The initial model is trained based on the historical color difference parameter value, so that the trained model can specifically clarify the corresponding relationship between the historical color difference parameter value and the historical second dyeing time.

At this block, it is specifically necessary to obtain the historical color difference parameter value by making a difference between the historical first color value and the historical second color value. Taking the LAB color mode as an example, if the historical second color value is $L_2/A_2/B_2$, and the historical first color value is $L_1/A_1/B_1$, then at this block, each color component in the historical second color value can be subtracted from each color component in the historical first color value, that is, through $L_2-L_1=\Delta L$, $A_2-A_1=\Delta A$, $B_2-B_1=\Delta B$, the historical color difference parameter value $\Delta L/\Delta A/\Delta B$ can be obtained.

Block S303, the dyeing device determines a historical dyeing rate of the workpiece according to the historical dyeing time and the historical color value.

This block is basically similar to block S202 in the above embodiment. Specifically, the historical dyeing rate may include a historical first dyeing rate corresponding to the first dyeing. That is, in the embodiment of the present application, the historical first color value corresponding to a same dyeing process of a same workpiece can be divided by the historical first dyeing time to obtain a corresponding dyeing rate, that is, the historical first dyeing rate. A specific calculation process of icJ the dyeing rate has been introduced in detail in the embodiment of the present application, and will not be repeated here. In a subsequent block, the initial model can be trained based on the historical first dyeing rate to obtain the dyeing model.

Specifically, the historical dyeing rate may include a historical second dyeing rate corresponding to the second dyeing. That is, in the embodiment of the present application, the historical second color value corresponding to a same dyeing process of ae same workpiece can be divided by the historical second dyeing time to obtain a dyeing rate corresponding to the second dyeing process, that is, the historical second dyeing rate. A specific calculation process of the dyeing rate has been introduced in detail in the above-mentioned embodiment of the application, and will not be repeated here. In a subsequent block, the initial model can be trained based on the historical second dyeing rate to obtain the dyeing model.

Block S304, the dyeing device obtains a dyeing model by training the initial model based on the historical color difference parameter value, the historical dyeing rate and the historical dyeing time.

At this block, the initial model is trained based on the historical color difference parameter value, the historical dyeing rate and the historical dyeing time to obtain the dyeing model. Specifically, when the historical dyeing rate includes the historical first dyeing rate, this block may include: obtaining the dyeing model by training the initial model based on the historical color difference parameter value, the historical first dyeing rate, and the historical dyeing time. When the historical dyeing rate includes the historical second dyeing rate, this block may include: obtaining the dyeing model by training the initial model based on the historical color difference parameter value, the historical second dyeing rate, and the historical dyeing time. The specific content about training the initial model will be introduced in detail in the following application examples, and will not be repeated here.

The method for establishing a dyeing model provided in the embodiment of the present application uses historical data to establish a dyeing model that can establish a relationship between the dyeing time and the color value of the dyed workpiece. The dyeing rate and the color difference parameter value are combined to establish the dyeing model, and an accuracy of the dyeing model is improved. Based on the dyeing model, the dyeing time required for the workpiece can be determined according to a color value of the workpiece after dyeing. A precise dyeing process can be realized by determining the dyeing time using the dyeing model instead of determining the dyeing time manually. The specific content about the establishment method of a dyeing model provided by this application will be described in detail in the following application examples.

Referring to FIG. 4, FIG. 4 is a flow chart of a third specific method for establishing a dyeing model provided in the embodiment of the present application. The third specific method for establishing the dyeing model is applied to the dyeing device. According to different requirements, an order of blocks in the flowchart of the third specifical method can be changed, and some blocks can be omitted.

Referring to FIG. 3, in the embodiment of the present application, the third specifical method for establishing the dyeing model includes following blocks.

Block S401, the dyeing device obtains the historical data of dyeing the workpiece, the historical data further includes historical apparatus parameters during producing the workpiece. At this block, except the historical dyeing time and the historical color value mentioned above, the historical data may further include the historical apparatus parameters during producing the workpiece. The historical apparatus parameters are parameters generated when each device or equipment is running during a production process of the workpiece. First of all, it needs to be explained that the production process of the workpiece usually not includes only a dyeing process, but includes a plurality of processes, including a process of oxidative degreasing, a process of alkali biting, a process of chemical polishing, a process of neutralization, a process of anodizing, a process of acid treatment before dyeing, a process of dyeing and sealing, etc., each action corresponds to a process, and when works in a corresponding process, its device or equipment produces corresponding parameters, that is, apparatus parameters; after each step, it will have an impact on the workpiece, and then generate corresponding workpiece parameters.

For example, during the process of acid treatment before dyeing, a pH value of a solution can be used as a device parameter, and correspondingly after the process of anodizing, a thickness of an oxide layer can be used as a workpiece parameter. In the embodiment of the present application, the historical apparatus parameters may be historical apparatus parameters of the dyeing apparatus during the dyeing process of the workpiece, that is, the apparatus parameters generated by the dyeing apparatus in history. Further, the historical data may also include historical workpiece parameters of the workpiece after the dyeing process, that is, the workpiece parameters carried by the workpiece after each process in history. Usually, the historical color value can be used as one of the workpiece parameters. That is, the historical apparatus parameters include the workpiece parameters. Of course, the historical apparatus parameters may also include parameters of other manufacturing processes, the specific content of which can be set according to the actual situation, and is not specifically limited here. Of course, in the embodiment of the present application, the target parameter when training the initial model is usually the historical dyeing time, such as the historical second dyeing time, which focuses on the dyeing process. Therefore, the historical apparatus parameters used in the embodiment of the present application may only be the apparatus parameters generated when the dyeing tank is working.

Specifically, in the embodiment of the present application, the historical apparatus parameters include any one or any combination of the following: a concentration value of a dye, a pH value of the dye, and a temperature value of the dye. Of course, other parameters may also be selected as the historical apparatus parameters, which are not specifically limited here.

It should be noted that, in the embodiment of the present application, the historical apparatus parameters usually include a plurality of parameters, and an amount of data thereof is usually complicated. Correspondingly, after this block, it may generally further include: complementing missing values of the historical apparatus parameters, and processing abnormal values of the historical apparatus parameters. The accuracy of the final dyeing model can be further improved by completing missing values of historical apparatus parameters and processing the abnormal values. For specific content about the processor of completing and the processing of the abnormal values, reference may be made to the prior art, which will not be repeated here.

Block S402, the dyeing device obtains a historical color difference parameter value based on the historical first color value and the historical second color value.

Block S403, the dyeing device determines a historical dyeing rate of the workpiece according to the historical dyeing time and the historical color value.

Block S404, the dyeing device obtains a dyeing model by training the initial model based on the historical data and the historical dyeing rate.

The block S402 to block S404 are basically the same as the block S302 to block S304 in the above embodiments, the difference is that the historical data may include not only the above historical dyeing time and the historical color value, but also include the historical apparatus parameters during producing the workpiece. For other details, please refer to the above embodiments, details are not repeated here.

In the embodiment of the present application, the initial model may be a locally weighted linear regression model. The principle of the locally weighted linear regression model is to check data set and only consider data points located within a certain range around a point to be predicted. Do linear regression (local linear regression) on the data points within the certain range. When using the least squares method to solve regression parameters, add weight considerations and assign a certain weight to each point within the certain range, and the weight value increases with a distance from the point to be predicted. The distance increases and gradually decays, the farther away from the point to be predicted, the smaller the weight value. Finally, according to a fitting line, the point to be predicted is evaluated and predicted.

That is, in the embodiment of the present application, it is preferable to use the locally weighted linear regression model as the initial model, and train the locally weighted linear regression model to obtain the dyeing model. Of course, in the embodiment of the present application, models of other algorithms may also be selected, which are not specifically limited here. Specifically, in the embodiment of the present application, the initial model is a model preset with corresponding weight coefficient for input data (such as the historical data and the historical dyeing rate) input into the initial model. That is, in the embodiment of the present application, corresponding weight coefficient is additionally set for each input data (such as the historical data and the historical dyeing rate).

Specifically, when the locally weighted linear regression model performs a calculation of a distance, different weights are given to different characteristics of a sample (such as the historical data and the historical dyeing rate) in the embodiment of the present application. Specifically, for the traditional locally weighted linear regression model, for each training data point, it is necessary to make:

$$\sum_{i=1}^{n} \omega^{(i)} \left( y^{(i)} - \theta^T x^{(i)} \right)^2$$

to be minimum, where i represents a number of training data and $x^{(i)}$ represents the i-th training data, because in the embodiment of this application, a set of training data has m features, so that there are m×1 vectors, $y^{(i)}$ represents a target value of the i-th training data, $\theta$ represents a coefficient vector of a regression equation; $\omega$ represents a Gaussian weight coefficient, which is expressed as:

$$\omega^{(i)} = \exp\left(-\frac{\left[\left(x^{(i)} - x\right)\right]^2}{2\tau^2}\right)$$

Where, $x^{(i)}$ represents the i-th training data, x represents a data point to be predicted; $\tau$ represents a bandwidth, the larger $\tau$ is, the stronger the local regression is.

In the embodiment of the present application, when using locally weighted linear regression for prediction, considering that different features (such as the historical data and the historical dyeing rate) have different influence weights on a target result, the weight coefficient of the feature is introduced when calculating the distance, at this time the original Gaussian weight coefficient becomes:

$$\omega^{(i)} = \exp\left(-\frac{\left[\left(x^{(i)} - x\right) * \alpha\right]^2}{2\tau^2}\right)$$

Among them, $x^{(i)}$ represents the i-th training data, x represents data point to be predicted; $\tau$ represents the bandwidth, the larger the $\tau$, the greater the strength of local regression; $\alpha$ represents a weight matrix of sample point features, which is used to represent different weights of different features for distance calculations.

Therefore, the model solves the regression coefficient as: $\theta = (X^T \omega X)^{-1} X^T \omega y$ Among them, X represents an n×(m+1) matrix composed of 1 (constant term) and $x^{(i)}$), n represents the number of training data, m represents the number of data features, and X can be written as:

$$X = \begin{pmatrix} 1 & \cdots & x_1^{(n)} \\ \vdots & \ddots & \vdots \\ 1 & \cdots & x_m^{(n)} \end{pmatrix}$$

Therefore, in the embodiment of the present application, the weight coefficient includes a weight coefficient matrix, and one of a total number of types of parameters of input data and a total number of the input data is equal to a number of rows of the weight coefficient matrix, and the other one is equal to a number of columns of the weight coefficient matrix. By training the initial model including the weight coefficient matrix, the obtained dyeing model is more accurate.

The embodiment of the present application provides the dyeing model that can establish a corresponding relationship between the dyeing time and the color value of the workpiece after dyeing using the historical data including the historical apparatus parameters. The dyeing rate and the color difference parameter value can be combined to improve the accuracy of the dyeing model. Based on this dyeing model, the required dyeing time of the workpiece can be determined according to the color value of the workpiece after dyeing. A precise dyeing process can be realized by determining the dyeing time using dyeing model instead of manually determining the dyeing time.

The following is an introduction to an establishing system for establishing a dyeing model provided by the embodiment of the present application. The establishing system described below and the method for establishing the dyeing model described above can be referred to in correspondence.

FIG. 5 is a structural block diagram of an establishing system for establishing the dyeing model provided in the embodiment of the present application. Referring to FIG. 5, the establishing system for establishing the dyeing model may include modules 100-200.

A history acquisition module 100 acquires the historical data of dyeing the workpiece, the historical data includes the historical dyeing time of the workpiece and the historical color value of the workpiece after dyeing.

A training module 200 obtains the dyeing model by training the initial model based on the historical data.

Optionally, in the embodiment of this application, the establishing system further includes:

A dyeing rate module, configured to determine the historical dyeing rate of the workpiece according to the historical dyeing time and the historical color value.

The training module 200 is further used to:

Train the initial model based on the historical data and the historical dyeing rate to obtain the dyeing model.

Optionally, in the embodiment of the present application, the historical dyeing time includes the historical first dyeing time for performing the first dyeing on the workpiece, and the historical second dyeing time for performing the second dyeing on the workpiece;

The historical color value includes the historical first color value after the first dyeing is performed on the workpiece, and the historical second color value after the second dyeing is performed on the workpiece;

The training module 200 includes:

A historical color difference parameter value unit, configured to obtain the historical color difference parameter value based on the historical first color value and the historical second color value;

A first training unit, configured to train the initial model based on the historical color difference parameter value, the historical dyeing rate and the historical dyeing time to obtain the dyeing model.

Optionally, in this embodiment of the present application, the historical dyeing rate includes the historical first dyeing rate corresponding to the first dyeing;

The training module 200 includes:

A historical first dyeing rate unit, configured to obtain the historical first dyeing rate based on the historical first color value and the historical first dyeing time;

A second training unit, configured to train the initial model based on the historical color difference parameter value, the historical first dyeing rate and the historical dyeing time to obtain the dyeing model.

Optionally, in the embodiment of the present application, the historical dyeing rate includes the historical second dyeing rate corresponding to the second dyeing;

The training module 200 includes:

A historical second dyeing rate unit, configured to obtain the historical second dyeing rate based on the historical second color value and the historical second dyeing time;

A third training unit, configured to train the initial model based on the historical color difference parameter value, the historical second dyeing rate and the historical dyeing time to obtain the dyeing model.

Optionally, in this embodiment of the present application, the historical first color value is the statistical value of a plurality of historical first color values, and the historical second color value is the statistical value of a plurality of historical second color values.

Optionally, in this embodiment of the application, the history acquisition module 100 is used to:

Obtain the historical data of dyeing the workpiece, and the historical data further includes the historical apparatus parameters during producing the workpiece.

Optionally, in this embodiment of the present application, the initial model is the model preset with the corresponding weight coefficient for the data input into the initial model.

Optionally, in this embodiment of the present application, the weight coefficient includes the weight coefficient matrix, and one of the total number of types of parameter of the input data and the total number of the input data is equal to the number of rows in the weight coefficient matrix, and the other one is equal to the number of columns of the weight coefficient matrix.

Optionally, in the embodiment of the present application, the historical apparatus parameters are historical parameters of the dyeing apparatus during the dyeing process of the workpiece.

Optionally, in this embodiment of the present application, the historical apparatus parameters include any one or any combination of the following:

The concentration value, the pH value, and the temperature value of the dye.

The establishing system for establishing the dyeing model in this embodiment is used to implement the method for establishing the dyeing model, so the specific implementation of the establishing system for establishing the dyeing model can be referred to the example part of the method for establishing the dyeing model above, for example, the history acquisition module 100, and the training module 200 are used to respectively implement block S101 and block S102 in the method for establishing the dyeing model. Therefore, for its specific implementation, reference may be made to the descriptions of the corresponding parts of the embodiments, which will not be repeated here.

Please refer to FIG. 6, which is a flow chart of a dyeing method provided in an embodiment of the present application. The dyeing method is applied to the dyeing device. According to different requirements, an order of blocks in the flowchart of the dyeing method can be changed, and some blocks can be omitted.

Referring to FIG. 6, in the embodiment of the present application, the dyeing method includes following blocks.

Block S501, the dyeing device acquires a first color value of the workpiece after the first dyeing is performed on the workpiece, and acquires a target color value of the workpiece.

At this block, it is necessary to obtain the first color value of the workpiece after the first dyeing and the target color value of the workpiece, so as to subsequently determine the dyeing time corresponding to the second dyeing according to the dyeing model and the target color value. It should be noted that parameters finally input to the dyeing model in the embodiment of the present application substantially correspond to the parameters used to train the dyeing model in the above-mentioned embodiment of the application. In the embodiment of the present application, the final output result of the dyeing model is a target second dyeing time corresponds to the historical second dyeing time, and the first color value at this block corresponds to the historical first color value in the above-mentioned application embodiment.

Block S502, the dyeing device determines a target second dyeing time required for the second dyeing based on the first color value, the target color value, and the dyeing model.

In the embodiment of the present application, the dyeing model is the model obtained by training the initial model based on the historical data of dyeing the workpiece; the historical data includes the historical dyeing time of the workpiece and the historical color value of the workpiece after dyeing. The establishment process of the dyeing model has been introduced in detail in the above-mentioned embodiment of the application, and will not be repeated here.

At this block, the first color value and the target color value are input into the dyeing model, so that the target second dyeing time required for the second dyeing is output by the dyeing model. The specific content of this block will be introduced in detail in the following application examples, and will not be repeated here.

Block S503, the dyeing module performs the second dyeing on the workpiece based on the target second dyeing time.

At this block, the workpiece is subjected to the second dyeing based on the target second dyeing time, thereby realizing an accurate second dyeing process.

The dyeing method provided in the embodiment of the present application uses the historical data to establish the dyeing model that establish the corresponding relationship between the dyeing time and the color value of the workpiece after dyeing, and based on the dyeing model, a time required for dyeing the workpiece can be determined according to the color value of the workpiece after dyeing. The precise dyeing process can be realized by determining the dyeing time using the dyeing model instead of determining the dyeing time manually.

The specific content of the dyeing method provided in the embodiment of the present application will be described in detail in the following application embodiment.

Please refer to FIG. 7, which is a flow chart of a first detailed dyeing method provided in the embodiment of the present application. The first detailed dyeing method is applied to the dyeing device. According to different requirements, an order of blocks in the flowchart of the first detailed dyeing method can be changed, and some blocks can be omitted.

Referring to FIG. 7, in the embodiment of the present application, the first detailed dyeing method includes following blocks.

Block S601, the dyeing device acquires the first color value of the workpiece after the first dyeing.

This block is basically the same as the block S501, and will not be repeated here.

Block S602, the dyeing device obtains a first dyeing time used for the first dyeing.

At this block, specifically, the first dyeing time is corresponding to the first color value, and is used for subsequent calculation of a first dyeing rate. The first dyeing time used for the first dyeing corresponds to the historical first dyeing time in the embodiment of the above application, and is a time spent on the workpiece in the process of the first dyeing. This block and the block S601 can be executed in any order or in parallel, depending on the specific situation, and no specific limitation is made here.

Block S603, the dyeing device determines a first dyeing rate based on the first dyeing time and the first color value.

At this block, the first color value may be divided by the first dyeing time to obtain a corresponding first dyeing rate. The specific calculation process of the first dyeing rate has been introduced in detail in the above-mentioned embodiment of the application, and will not be repeated here. At this block, the first dyeing rate corresponds to the historical first dyeing rate in the above application examples.

Block S604, the dyeing device determines a target second dyeing time required for the second dyeing based on the first color value, the first dyeing rate, the target color value and the dyeing model.

At this block, the first color value, the first dyeing rate, and the target color value will be input into the dyeing model to obtain the target second dyeing time required for the second dyeing.

At this block, the embodiment of the present application may further includes: acquiring a target color value of the workpiece; and determining a target color difference based on the first color value and the target color value. The target color value is a color value that the workpiece needs to achieve after the second dyeing, which corresponds to the historical second color value in the above-mentioned application embodiment. In the embodiment of the present application, the difference between the target color value and the first color value can be further made, usually by making a difference between the color components corresponding to the two color values to obtain the target color difference, which is usually expressed as $\Delta L/\Delta A/\Delta B$. Afterwards, the target color difference will be input into the dyeing model to obtain the target second dyeing time.

Correspondingly, this block generally specifically includes: determining the target second dyeing time required for the second dyeing based on the target color difference, the first dyeing rate and the dyeing model. That is, input the target color difference and the first dyeing rate into the dyeing model to obtain the target second dyeing time.

Block S605, the dyeing device performs the second dyeing on the workpiece based on the target second dyeing time.

At this block, the workpiece is subjected to the second dyeing based on the target second dyeing time, thereby realizing an accurate second dyeing process.

The first detailed dyeing method provided in the embodiment of the present application uses the historical data to establish the dyeing model that can establish a relationship between the dyeing time and the color value of the workpiece after dyeing, and based on the dyeing model, the time required for dyeing the workpiece can be determined according to the color value of the workpiece after dyeing. The precise dyeing process can be realized by determining the dyeing time using the dyeing model instead of determining the dyeing time manually.

The specific content of the first detailed dyeing method provided in the embodiment of the present application will be described in detail in the following application embodiment.

Please refer to FIG. 8, which is a flow chart of a second detailed dyeing method provided by the embodiment of the present application. The second detailed dyeing method is applied to the dyeing device. According to different requirements, an order of blocks in the flowchart of the second detailed dyeing method can be changed, and some blocks can be omitted.

Referring to FIG. 8, in the embodiment of the present application, the second detailed dyeing method includes following blocks.

Block S701, the dyeing device acquires the first color value of the workpiece after the first dyeing.

Block S702, the dyeing device obtains the first dyeing time used for the first dyeing.

The block S701 to block S702 are basically the same as block S601 to block S602 in the above application embodiment, please refer to the above embodiment for details, and will not be repeated here.

Block S703, the dyeing device obtains the apparatus parameters during producing the workpiece.

At this block, parameters of a color device when dyeing the workpiece, that is, the apparatus parameters, are obtained. The apparatus parameters correspond to the historical apparatus parameters. For specific types and related preprocessing processes, reference may be made to the above-mentioned application embodiments, and details are not repeated here.

Specifically, in the embodiment of the present application, the apparatus parameters include the apparatus parameters of the dyeing tank during the dyeing process of the workpiece. At this time, the apparatus parameters can include any one or any combination of the following: the concentration value, the pH value and the temperature value of the dye. Certainly, other parameters may also be selected as apparatus parameters, which are not specifically limited here.

Block S704, the dyeing device determines the first dyeing rate based on the first dyeing time and the first color value.

This block is basically the same as block S603 in the above-mentioned application embodiment, and will not be repeated here.

Block S705, the dyeing device determines a target second dyeing time required for the second dyeing based on the first color value, the first dyeing rate, the apparatus parameters and the dyeing model.

At this block, the first color value, the first dyeing rate and the apparatus parameters can be input into the dyeing model to obtain the target second dyeing time output by the dyeing model.

Block S706, the dyeing device performs the second dyeing on the workpiece based on the target second dyeing time.

At this block, the workpiece is subjected to the second dyeing based on the target second dyeing time, thereby realizing an accurate second dyeing process.

In the second detailed dyeing method provided in the embodiment of the present application, the dyeing model that can establish a corresponding relationship between the dyeing time and the color value of the workpiece after dyeing using the historical data, and based on the dyeing model, the time required for dyeing the workpiece can be determined according to the color value of the workpiece after dyeing. The precise dyeing process can be realized by determining the dyeing time using the dyeing model instead of determining the dyeing time manually.

Please refer to FIG. 9, which is a flow chart of a third detailed dyeing method provided by the embodiment of the present application. The third detailed dyeing method is applied to the dyeing device. According to different requirements, an order of blocks in the flowchart of the third detailed dyeing method can be changed, and some blocks can be omitted. The third detailed dyeing method includes the following blocks.

Block S802, the dyeing device determines a plurality of component dyeing times based on the first dyeing time, the first color value, the target color value and the dyeing model, each of the plurality of component dyeing times corresponding to each of the plurality of color components.

The plurality of color components are components included in the color mode. That is, the LAB color mode is taken as an example, which includes three color components of L, A, and B. At this block, according to the color value, the component dyeing time corresponding to each color component can be output, such as a component dyeing time $T2_L$ Corresponding to the color component L, a component dyeing time $T2_A$ corresponding to the color component A, and a component dyeing time $T2_B$ corresponding to the color component B.

Block S803, the dyeing device obtains a target second dyeing time based on the plurality of component dyeing times.

At this block, the target second dyeing time is obtained according to the component dyeing time of each color component.

The block S802 may further output a weight value corresponding to each color component, correspondingly, the block S802 may specifically include: determining the component dyeing time corresponding to each color component, and the weight value corresponding to each color component, based on the first color value and the dyeing model. Correspondingly, at this block, the target second dyeing time can be obtained based on the weight value and the component dyeing time, that is, at this block, the target second dyeing time can be determined in a weighted manner. At this block, the target second dyeing time may be determined by means of weighted summation. At this time, this block may include: obtaining the target second dyeing time by weighting and summing the weight value and the corresponding component dyeing time. Of course, the specific process and calculation content of the weighting calculation can be set according to the actual situation, and no specific limitation is made here.

It should be noted that before starting to train the dyeing model, a certain value is assigned to the weight value corresponding to each color component based on experience, for example, for the weight values WL, WA, and WB corresponding to the color components L, A, and B, respectively, grant WL-55%, WA=5%, and WB=40%. In the subsequent training process, the dyeing model will aim to be close to a final value, and constantly adjust the weight value so that it conforms to the actual situation. In the training process of the dyeing model, it is also based on a color component color difference parameter value corresponding to each color component in the historical color difference parameter value, such as $\Delta L$, $\Delta A$, $\Delta B$, etc., respectively training the corresponding relationship between the color component color difference parameter value (such as $\Delta L$, $\Delta A$, $\Delta B$) and the component dyeing time (such as $T2_L$, $T2_A$, $T2_B$), Combining with the weight value obtained from the training, the corresponding relationship between the historical color value and the historical dyeing time is obtained.

Block S804, the dyeing device performs the second dyeing on the workpiece based on the target second dyeing time.

Block S805, the dyeing device acquires the second color value of the workpiece after the second dyeing.

At this block, the color value of the workpiece after the second dyeing, i.e., the second color value, is further acquired. It should be noted that in this application, each color value, including the acquisition of the first color value and the second color value, can be acquired automatically instead of manual measurement by personnel. Specifically, in the embodiment of the present application, the second color value of the workpiece after the second dyeing can be automatically obtained through automatic detection equipment, for example, a manipulator cooperating with an online detection equipment. Correspondingly, this block may specifically include: acquiring the second color value automatically measured by the online detection device through the manipulator. Of course, for the color value, the acquisition process including obtaining the first color value and the second color value is not specifically limited in this embodiment of the application, and it depends on specific circumstances.

Block S806, the dyeing device determines whether the workpiece has finished dying based on the second color value and a dyeing standard.

At this block, it can be determined whether the workpiece has completed the second dyeing process according to the second color value and its corresponding dyeing standard. When the dyeing is completed, a subsequent process of processing the workpiece can be continued, and when the dyeing is not completed, the dyeing method provided in the embodiment of the present application can be repeated to re-dye the workpiece, or the processes such as an early warning and a reminder can be carried out as the case may be.

The dyeing standard may specifically be a preset range of the second color value. Specifically, the dyeing device may first calculate a difference between the second color value and the target color value, and then determine whether the difference is within the preset range. If the difference is within the preset range, the dyeing device determines that the workpiece has been dyed; if the difference is not within the preset range, the dyeing device determines that the workpiece has not been dyed. Of course, if the purpose of the second dyeing of the workpiece in the embodiment of the present application is to generate a gradient color, the dyeing standard can be further expanded to be related to other dyeing processes on the workpiece, such as a previous color value dyed by a previous dyeing process, that is the first color value, calculating a difference between the previous color value and a corresponding dyeing standard, and determine whether the difference is within a preset range. Because the difference between the second color value and the first color value can reflect whether a color transition of the gradient color is uniform. Therefore, it is determined whether the difference between the second color value and the first color value is within the preset range, if the difference is within the preset range, then the color gradient of the workpiece is uniform, and it is determined that the workpiece has been finished the dyeing process; if the difference is not within the preset range, it is determined that the color gradient of the workpiece is changed uneven, and the workpiece has not finished the dyeing process. Certainly, the dyeing standard may also include other content, which is not specifically limited here.

The following is an introduction to a dyeing system provided in the embodiment of the present application, and the dyeing system described below and the dyeing method described above can be referred to in correspondence.

Figure 10:
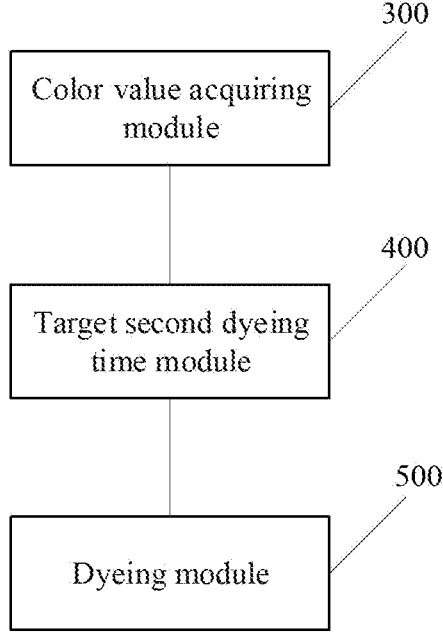
FIG. 10 is a structural block diagram of a dyeing system provided by one embodiment of the present application.

FIG. 10 is a structural block diagram of the dyeing system provided in the embodiment of the present application. Referring to FIG. 10, the dyeing system may include following modules 300-400.

A color value acquiring module 300 acquires the first color value of the workpiece after the first dyeing and the target color value of the workpiece.

A target second dyeing time module 400 determines the target second dyeing time required for the second dyeing based on the first color value, the target color value and the dyeing model;

A dyeing module 500 performs the second dyeing on the workpiece based on the target second dyeing time;

Among them, the dyeing model is the model obtained by training the initial model based on the historical data of dyeing the workpiece; the historical data includes the historical dyeing time of the workpiece and the historical color value of the workpiece after dyeing.

Optionally, in the embodiment of this application, it also includes:

A dyeing time acquisition module is used to acquire the dyeing time used for one dyeing.

The target second dyeing time module 400 includes:

A first dyeing rate unit, configured to determine a first dyeing rate based on the first dyeing time and the first color value;

The first target second dyeing time unit is used to determine the target second dyeing time required for the second dyeing based on the first color value, the first dyeing rate and the dyeing model.

Optionally, in the embodiment of this application, it also includes:

The device parameter acquisition module is used to obtain the apparatus parameters during producing the workpiece;

The target second dyeing time module 400 is used for:

A target second dyeing time required for the second dyeing is determined based on the first color value, the target color value, the first dyeing rate, the apparatus parameters and a dyeing model.

Optionally, in the embodiment of the present application, the parameters include apparatus parameters of a dyeing tank during the dyeing process of the workpiece.

The dyeing system of this embodiment is used to realize the dyeing method, so the specific embodiments of the dyeing system can refer to the embodiment of the dyeing method described in the foregoing, for example, a color value acquisition module 300, a target second dyeing time module 400, and a dyeing module 500 of the dyeing system are respectively used to implement block S501 to block S503 of the establishing method for establishing the above dyeing model. Therefore, for its specific implementation, reference may be made to the descriptions of the corresponding partial embodiments, which will not be repeated here.

The embodiment of the present application below introduces a dyeing device, and the dyeing device described below and the method for establishing the dyeing model and the dyeing method described above can be referred to in correspondence.

Figure 11:
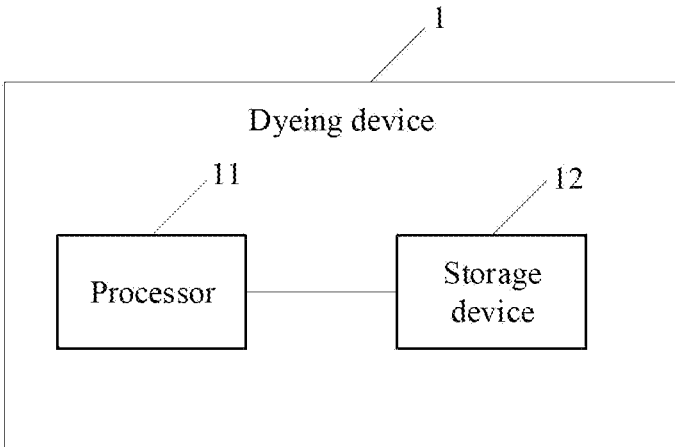
FIG. 11 is a structural block diagram of a dyeing device provided by one embodiment of the present application.

Please refer to FIG. 11, which is a structural block diagram of the dyeing device provided by an embodiment of the present application.

Referring to FIG. 11, a dyeing device 1 may include at least one processor 11 and a storage device 12. Those skilled in the art should understand that the structure of the dyeing device 1 shown in FIG. 11 does not constitute a limitation of the embodiment of the present application, and the dyeing device 1 may also include more or less other hardware or software than that in FIG. 11, or have different component arrangements. The dyeing device 1 may be a computer device.

The storage device 12 is used to store a computer program, and the at least one processor 11 is used to implement the method for establishing the dyeing model described in the embodiments and/or the specific content of the dyeing method when executing the computer program. The computer program includes the establishing system and/or the dyeing system. The modules/units mentioned in this application refer to a series of computer program segments that can be executed by the at least one processor 11 and can complete fixed functions, and are stored in the storage device 12.

The at least one processor 11 of the dyeing device a of this embodiment is used to execute the establishing system of the dyeing model and/or the dyeing system described in the above-mentioned application embodiments, and a combination of the at least one processor 11 and the storage device 12 can realize any of the establishment method of the dyeing model described in, and/or the dyeing method of the above-mentioned application embodiments. Therefore, the specific implementation of the dyeing device 1 can be referred to the establishing method of the dyeing model and the embodiment of the dyeing method, and its specific implementation can refer to the description of the corresponding embodiments of each part, and will not be repeated here.

Each embodiment in this specification is described in a progressive manner, each embodiment focuses on the difference from other embodiments, and the same or similar parts of each embodiment can be referred to each other. As for the device disclosed in the embodiment, since it corresponds to the method disclosed in the embodiment, the description is relatively simple, and for relevant details, please refer to the description of the method part.

The ordinally skilled in the art can further realize that the modules and algorithm steps of the examples described in conjunction with the embodiments disclosed herein can be implemented by electronic hardware, computer software or a combination thereof. In order to clearly illustrate the possible for interchangeability, in the above description, the composition and blocks of each example have been generally described according to their functions. Whether these functions are executed by hardware or software depends on the specific application and design constraints of the technical solution. The ordinally skilled in the art may use different methods to implement the described functions for each specific application, but such implementation should not be regarded as exceeding the scope of the present application.

The blocks of the methods or algorithms described in connection with the embodiments disclosed herein may be directly implemented by hardware, software modules executed by a processor, or a combination of both. Software modules can be placed in the storage device 12, and the storage device 12 can be a random access memory (RAM), an internal memory, a read-only memory (ROM), an electrically programmable ROM, an electrically erasable programmable ROM, a register, a hard disk, a removable disk, CD-ROM, or any other any other known storage medium.

Finally, it should also be noted that in this text, relational terms such as "first" and "second" etc. are only used to distinguish one entity or operation from another, and do not necessarily require or imply that these entities or operations, any such actual relationship or order exists. Furthermore, the term "comprise", "include" or any other variation thereof is intended to cover a non-exclusive inclusion such that a process, a method, an article, or a device including a set of elements includes not only those elements, but also includes elements not expressly listed, or further includes elements inherent in such process, method, article, or device. Without further limitation, an element defined by the statement "includes an . . . " does not preclude the presence of additional elements included in the process, method, article, or device that includes said element.

The method for establishing the dyeing model, the dyeing method, the dyeing device, and the computer-readable storage medium provided in the present application have been introduced in detail above. In this text, specific examples are used to illustrate the principles and implementation methods of the present application, and the descriptions of the above embodiments are only used to help understand the methods and core ideas of the present application. It should be pointed out that those skilled in the art can make some improvements and modifications to the application without departing from the principles of the application, and these improvements and modifications also fall within the protection scope of the claims of the application.

What is claimed is:

1. A method for establishing a dyeing model applied to a dyeing apparatus, the dyeing apparatus comprising a storage device and at least one processor, wherein the storage device stores a computer program which when executed by the at least one processor, causing the at least one processor to perform the method, wherein the method comprises:

obtaining historical data of dyeing a workpiece, the historical data comprising historical dyeing time of the workpiece and historical color value of the workpiece after dyeing, wherein the historical dyeing time comprises a historical first dyeing time of performing a historical first dyeing on the workpiece and a historical second dyeing time of performing a historical second dyeing on the workpiece; and the historical color value comprises a historical first color value of the workpiece after the historical first dyeing and a historical second color value of the workpiece after the historical second dyeing; wherein the historical data further comprises historical apparatus parameters during producing the workpiece, and the historical apparatus parameters are historical parameters of the dyeing apparatus during a dyeing process of the workpiece; wherein the historical apparatus parameters comprise any one or any combination of following: a concentration value of a dye, a pH value of the dye, and a temperature value of the dye;

obtaining the dyeing model by training an initial model based on the historical data, and comprising: obtaining a historical color difference parameter value based on the historical first color value and the historical second color value; determining a historical dyeing rate of the workpiece according to the historical dyeing time and the historical color value; and obtaining the dyeing model by training the initial model based on the historical data and the historical dyeing rate;

obtaining a first color value of the workpiece after a first dyeing, and obtaining a first dyeing time used for the first dyeing;

obtaining apparatus parameters during producing the workpiece;

determining a first dyeing rate based on the first dyeing time and the first color value;

determining a target second dyeing time required for a second dyeing based on the first color value, the first dyeing rate, the apparatus parameters and the dyeing model; and performing the second dyeing on the workpiece based on the target second dyeing time.

2. The method according to claim 1, wherein the dyeing apparatus comprises multiple equipment used in the dyeing process, the multiple equipment comprises a dyeing tank, and a heating pipe arranged on an upper end of the dyeing tank, and the historical apparatus parameters are apparatus parameters of the dyeing tank generated during the dyeing process.

3. The method according to claim 1, further comprising:
complementing missing values of the historical apparatus
parameters before training the initial model based on
the historical data.

4. The method according to claim 3, further comprising:
cleaning abnormal data in the historical data before train-
ing the initial model based on the historical data.

5. The method according to claim 1, further comprising:
determining the historical dyeing rate of the workpiece by
dividing the historical color value by the historical
dyeing time.

6. The method according to claim 1, wherein the initial
model is a locally weighted linear regression model.

7. The method according to claim 6, wherein the locally
weighted linear regression model is to examine data set and
consider data points located within a certain range around a
point to be predicted, perform a local linear regression on the
data points within the certain range, and when using the least
squares method to solve regression parameters, assign a
weight value to each point within the certain range, and
predict the point to be predicted according to a fitting line,
wherein the weight value of each point decreases with a
distance of each point from the point to be predicted.

8. The method according to claim 7, wherein when
calculating the distance, a Gaussian weight coefficient is
expressed as:

$$\omega^{(i)} = \exp\left(-\frac{\left[\left(x^{(i)} - x\right) * \alpha\right]^2}{2\tau^2}\right);$$

wherein $\omega^{(i)}$ represents the Gaussian weight coefficient for
the i-th training data, $x^{(i)}$ represents the i-th training
data, x represents the point to be predicted; $\tau$ represents
a bandwidth; $\alpha$ represents a weight matrix of sample
point features, which is used to represent different
weights of different features for distance calculations.

9. The method according to claim 6, wherein the initial
model is preset with a corresponding weight coefficient for
each input data.

10. The method according to claim 9, wherein input data
comprises the historical data and the historical dyeing rate.

11. The method according to claim 10, wherein a weight
coefficient of the historical data is different from a weight
coefficient of the historical dyeing rate.

12. A dyeing method, comprising:
acquiring a first color value of a workpiece after a first
dyeing is performed on the workpiece and acquiring a
target color value of the workpiece;
determining a target second dyeing time required for a
second dyeing based on the first color value, the target
color value, and a dyeing model;
performing the second dyeing on the workpiece based on
the target second dyeing time, wherein the dyeing
model is a model obtained by training an initial model
based on historical data of dyeing the workpiece, and
the historical data comprises historical dyeing time of
the workpiece and historical color value of the work-
piece after dyeing;
wherein the historical dyeing time comprises a historical
first dyeing time of performing a first dyeing on the
workpiece and a historical second dyeing time of performing a second dyeing on the workpiece; and the
historical color value comprises a historical first color
value of the workpiece after the first dyeing and a
historical second color value of the workpiece after the
second dyeing;

wherein determining the target second dyeing time
required for the second dyeing based on the first color
value, the target color value, and the dyeing model
comprises:

determining a plurality of component dyeing times based
on the first dyeing time, the first color value, the target
color value and the dyeing model, each of the plurality
of component dyeing times corresponding to each of a
plurality of color components;

determining a weight value corresponding to each color
component; and obtaining the target second dyeing time based on the
weight value corresponding to each color component
and the plurality of component dyeing times, and
comprises: weighting and summing the weight value
corresponding to each color component and a corre-
sponding component dyeing time.

13. The method according claim 12,
wherein the initial model is a locally weighted linear
regression model.

14. The method according to claim 13,
wherein the initial model is preset with a corresponding
weight coefficient for each input data.

15. The method according to claim 12,
wherein the historical data further comprises historical
apparatus parameters during producing the workpiece,
and the historical apparatus parameters are historical
parameters of a dyeing apparatus during a dyeing
process of the workpiece.

16. The method according to claim 15,
wherein the historical apparatus parameters comprise any
one or any combination of following: a concentration
value of a dye, a pH value of the dye, and a temperature
value of the dye.

17. The method according to claim 16,
further comprising:
complementing missing values of the historical apparatus
parameters before training the initial model based on
the historical data.

18. The method according to claim 17,
further comprising:
cleaning abnormal data in the historical data before train-
ing the initial model based on the historical data.

19. The method according to claim 12, after performing
the second dyeing on the workpiece based on the target
second dyeing time, the method further comprising:
acquiring a second color value of the workpiece after the
second dyeing; and
determining whether the workpiece has completed dyeing
based on the second color value and a dyeing standard.

20. A dyeing device, comprising:
a storage device storing a computer program; and
at least one processor executing the computer program to
realize the dyeing method according to claim 12.

* * * * *